(12) United States Patent
Allam (10) Patent No.: US 8,753,427 B2
(45) Date of Patent: Jun. 17, 2014

(54) SYSTEMS AND PROCESSES FOR PROCESSING HYDROGEN AND CARBON MONOXIDE

(75) Inventor: Rodney J. Allam, Wiltshire (GB)

(73) Assignee: GTLpetrol LLC, New York, NY (US)

( * ) Notice: Subject to any disclaimer, the term of this patent is extended or adjusted under 35 U.S.C. 154(b) by 0 days.

(21) Appl. No.: 13/195,712

(22) Filed: Aug. 1, 2011

(65) Prior Publication Data

US 2012/0056132 A1 Mar. 8, 2012

Related U.S. Application Data

(63) Continuation of application No. 12/390,100, filed on Feb. 20, 2009, now Pat. No. 7,988,765.

(60) Provisional application No. 61/030,207, filed on Feb. 20, 2008, provisional application No. 61/030,199, filed on Feb. 20, 2008.

(51) Int. Cl.
| | |
|---|---|
| *B01D 53/02* | (2006.01) |
| *C10G 2/00* | (2006.01) |
| *C10K 1/32* | (2006.01) |
| *C01B 3/36* | (2006.01) |
| *C10K 1/20* | (2006.01) |
| *C10K 1/26* | (2006.01) |
| *C10J 3/00* | (2006.01) |
| *C01B 3/56* | (2006.01) |

(52) U.S. Cl.
CPC ... *C10K 1/26* (2013.01); *C10G 2/32* (2013.01); *C10K 1/32* (2013.01); *C01B 2203/025* (2013.01); *C01B 2203/061* (2013.01); *C01B 3/36* (2013.01); *C01B 2203/047* (2013.01); *C01B 2203/0465* (2013.01); *C10K 1/20* (2013.01); *C01B 2203/0495* (2013.01); *C10J 2300/1659* (2013.01); *C01B 2203/0244* (2013.01); *C01B 2203/146* (2013.01); *C01B 2203/048* (2013.01); *C10J 3/00* (2013.01); *C01B 2203/062* (2013.01); *C01B 2203/0475* (2013.01); *C01B 2203/043* (2013.01); *C01B 2203/148* (2013.01); *C01B 3/56* (2013.01)
USPC .......... 95/96; 95/139; 95/143; 96/121

(58) Field of Classification Search
USPC ............ 95/96, 139, 143; 96/121; 55/345
See application file for complete search history.

(56) References Cited

U.S. PATENT DOCUMENTS

| | | |
|---|---|---|
| 5,232,467 A | 8/1993 | Child et al. |
| 5,669,960 A | 9/1997 | Couche |

(Continued)

FOREIGN PATENT DOCUMENTS

| | | |
|---|---|---|
| DE | 3308304 A1 | 9/1984 |
| DE | 199 33 301 A1 | 1/2001 |

(Continued)

OTHER PUBLICATIONS

International Preliminary Report on Patentability issued in international application No. PCT/US2009/034704, mailed Sep. 2, 2010, 6 pages.

(Continued)

*Primary Examiner* — Robert A Hopkins
(74) *Attorney, Agent, or Firm* — Fish & Richardson P.C.

(57) ABSTRACT

In various implementations, various feed gas streams which include hydrogen and carbon monoxide may be processed for conversion to product streams. For example, the feed gas stream may be processed using the Fischer-Tropsch process or a methanol synthesis process. Unconverted hydrogen and carbon monoxide can be recycled at high recovery and/or inert components removed to prevent build-up in the recycle system by using an arrangement of pressure swing adsorption systems designed to recover impure product gas streams.

20 Claims, 4 Drawing Sheets

(56) References Cited

U.S. PATENT DOCUMENTS

6,740,230 B1 5/2004 Hugo et al.
2004/0081614 A1 4/2004 Ying et al.

FOREIGN PATENT DOCUMENTS

| JP | 2003-504501 A | 2/2003 |
|---|---|---|
| KR | 10-1994-0000555 A | 1/1994 |
| KR | 10-2007-0086408 | 8/2007 |
| RU | 2 322 285 C2 | 4/2008 |
| SU | 146286 | 1/1962 |
| WO | WO2006066892 A1 | 6/2006 |
| WO | WO 2007/012756 | 2/2007 |

OTHER PUBLICATIONS

International Search Report and Written Opinion of the International Searching Authority issued in international application No. PCT/US2009/034704, Oct. 1, 2009, 9 pages.
Office Action issued in Chinese Patent Application No. 200980109857.4 on Dec. 5, 2012, 11 pages.
Patent Examination Report No. 2 issued in Australian Application No. 2009215419 on May 10, 2013; 6 pages.
Decision of Grant issued in Russian Application No. 2010138551 on Sep. 2, 2013; 15 pages.
First Examination Report from Australian Patent Office in Appl. No. 2009215419 mailed on Apr. 9, 2013, 3 pages.
Communication and Search Report from EPO for Application No. 09713611.3-1361 dated Apr. 14, 2014; 13 pages.

FIG 2

FIG. 3
FISCHER-TROPSCH GAS FEED AND UNCONVERTED GAS TREATING AND RECYCLE SYSTEM

FIG 4

SYSTEMS AND PROCESSES FOR PROCESSING HYDROGEN AND CARBON MONOXIDE

CLAIM OF PRIORITY

This application is a continuation of and claims priority under 35 USC §119(e) to U.S. patent application Ser. No. 12/390,100 now U.S. Pat. No. 7,988,765, filed on Feb. 20, 2009, the entire contents of which are hereby incorporated by reference, which claims priority under 35 USC §119(e) to U.S. Patent Application Ser. No. 61/030,207, filed on Feb. 20, 2008, the entire contents of which are hereby incorporated by reference, and claims priority under 35 USC §119(e) to U.S. Patent Application Ser. No. 61/030,199, filed on Feb. 20, 2008, the entire contents of which are hereby incorporated by reference.

TECHNICAL FIELD

The present invention relates to processes and systems of processing carbon monoxide and hydrogen.

BACKGROUND

Hydrocarbon and carbonaceous feedstocks can be converted into $H_2+CO$ synthesis gas mixtures with varying ratios of $H_2$ to CO. These synthesis gas mixtures can be converted into valuable hydrocarbons and chemicals using catalytic processes. Examples of the feedstocks are coals, natural gas, oil fractions, bitumen and tar-like refinery wastes, pet-coke and various forms of biomass. Examples of the main conversion processes used to produce the synthesis gas are partial oxidation, steam reforming, auto-thermal reforming, convective reforming, carbon monoxide shift conversion, and combinations of these processes.

SUMMARY

In various implementations, unconverted synthesis gas, which is a bi-product left after catalytic conversion of synthesis gas in a conversion process, includes, in addition to hydrogen and carbon monoxide, inert gas components, which do not take part in the reactions, and some residual products and by-products of the conversion process. For example, catalytic processes, such as Fischer-Tropsch (FT) hydrocarbons, methanol, oxo alcohols, and methane, do not in general result in complete conversion of the feed synthesis gas into the desired products. There will be some unconverted synthesis gas which it would be desirable to recycle back to the inlet of the catalytic conversion process. The unconverted synthesis gas will, in general, be accompanied by inert gases such as argon, nitrogen, carbon dioxide, and methane, which arise, for example, from admixture with oxygen used in partial oxidation or auto thermal reforming to produce the synthesis gas, or from the carbonaceous or hydrocarbon feedstock used. In addition, there may be side reactions in the catalytic syngas conversion processes which produce bi-products such as $CH_4$, $CO_2$, and possibly $C_3$ and $C_4$ components and oxygenated organic components.

To improve process economics, maximizing or otherwise increasing conversion efficiency of feedstocks to final products may be achieved by treating the final exit gases from the catalytic synthesis gas conversion process with one or more of the following overall features:

Separate the unconverted synthesis gas with the minimum proportion of inerts and other bi-products, and recycle this back to the feed point of the synthesis gas conversion process. The proportion of recycled inerts may be selected to inhibit a buildup of inert gas concentration in the catalytic conversion process, which may affect conversion rates and/or equilibrium of the reactions.

Separate the hydrocarbon fraction in the unconverted exit gas from the reaction system and recycle a specified (e.g., a maximum, threshold) quantity of this back to the synthesis gas production process.

Separate carbon dioxide and other inert gases such as argon and nitrogen, together with a specified (e.g., minimum, threshold) concentration of flammable components, and reject these as a vent gas stream to a fuel gas main where they can be combusted and the combustion products released to atmosphere or subjected to further processing.

These features may be achieved by a combination of gas separation and recycle, which is a function of the process technology used for the generation of the synthesis gas and the catalytic synthesis gas process under consideration, and the feedstock used in the synthesis gas production process.

The details of one or more embodiments of the invention are set forth in the accompanying drawings and the description below. Other features, objects, and advantages of the invention will be apparent from the description and drawings.

DESCRIPTION OF DRAWINGS

Like reference symbols in the various drawings indicate like elements.

DETAILED DESCRIPTION

In various implementations based on the conversion of syngas to products in a system in which it is desirable to recycle unconverted syngas and/or limit the concentration of inert components in the syngas feed, an off gas processing system can be devised based on a pressure swing adsorption process designed not to produce pure products but to separate the $CH_4$ and lower molecular weight hydrocarbons, and traces of oxygenates and other high molecular weight byproducts with reasonable recovery, followed by a second pressure swing adsorption process to separate non-hydrocarbon inerts, such as argon and nitrogen, from the enriched synthesis gas recycle stream. A feature of this system is that a high proportion of any $CO_2$ present is produced with the hydrocarbon fraction. This $CO_2$/hydrocarbon fraction with minimal synthesis gas content can be recycled back to the synthesis gas production process, where it can be used as a feedstock for synthesis gas production or as a fuel gas, or a combination of both.

Figure 1:
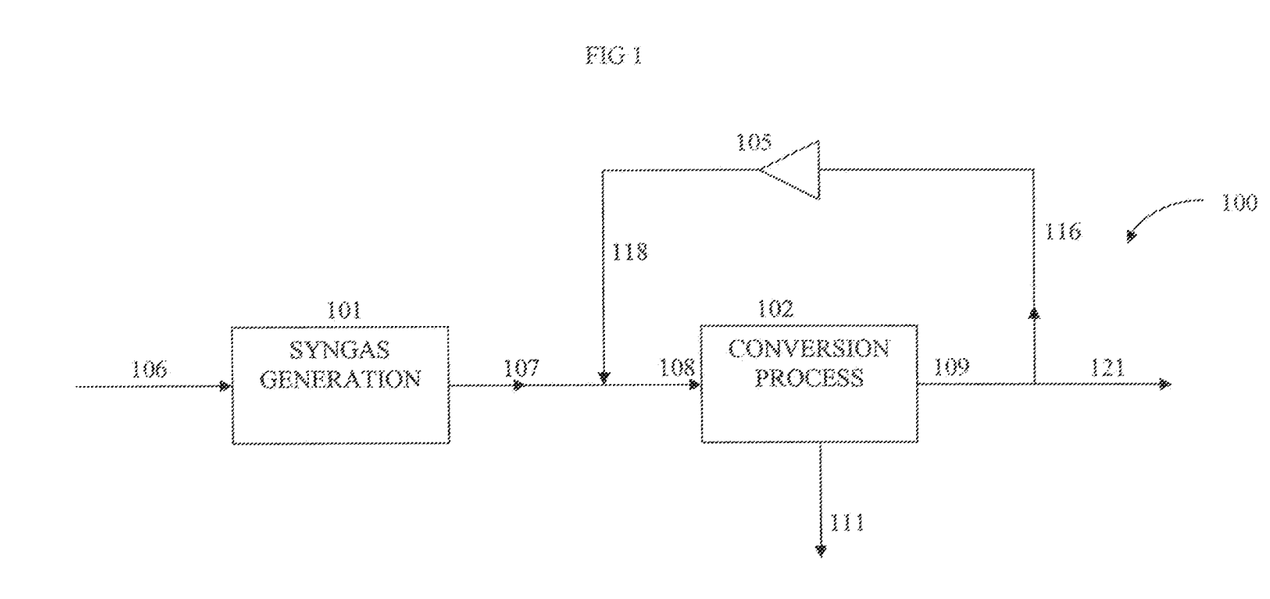
FIG. 1 is an example of a conventional methanol plant.

FIG. 1 illustrates an example of a conventional methanol plant 100 using natural gas feed 106 and oxygen feed 110 to an auto-thermal reformer 101 which produces the synthesis gas feed 107 to the once through catalytic methanol reactor 102 and product methanol separation system to produce a methanol product stream 111. Table 1 includes example streams for the system 100 illustrated in FIG. 1.

TABLE 1

| lb/mol/hr | Methanol Plant Feed | Methanol Product (fuel grade) | Purge Gas |
|---|---|---|---|
| CO | 4667.4 | 71.4 | 551.0 |
| H2 | 9458.4 | 20.4 | 1230.4 |
| CO2 | 831.2 | 213.6 | 571.0 |
| H2O | 48.2 | 94.3 | 0.5 |
| CH4 | 294.2 | 0 | 294.3 |
| N2 + Ar | 34.0 | 0 | 34.0 |
| CH3 OH | 0 | 4068.5 | 22.2 |
| Total | 15333.4 | 4468.5 | 2683.4 |
| Presssure (bar) | 101.8 | 96.6 | 96.6 |
| Temperature (° C.) | 37.8 | 37.8 | 37.8 |

As illustrated in FIG. 1, the build up of inerts $CH_4$ and $N_2+Ar$ is avoided by purge gas 121 being continuously withdrawn from the system. A gas circulator 105 is provided so that stream 116, which part of the total gas stream 109 leaving the catalytic reactor 102 after methanol product has been separated can be recycled as stream 118 and added to the syn-gas feed stream 107 to provide the feed stream 108 to the methanol reactor. to the feed 118 after methanol has been removed. The circulation rate of stream 116 is determined by the tolerable level of inerts concentration in the loop. This might be in the range 5% to 20% inerts concentration. The presence of inerts reduces the partial pressure of the synthesis gas which reduces the equilibrium methanol conversion at a fixed temperature. The source of feed synthesis gas affects the purge amount and recycle ratio. Synthesis gas from a natural gas with no nitrogen content which is produced in a stream—natural gas reformer would have only $CH_4$ inert. Synthesis gas produced from coal by partial oxidation or from natural gas by oxygen-based processes would have $CH_4$, together with $N_2+Ar$ inert. The purge gas 121 contains 12.6% of the $H_2+CO$ in the methanol plant feed 107, which must be used as fuel gas. The purge gas could be separated into an $H_2+CO$ rich stream for recycle too the methanol plant feed, plus a $CH_4$ rich stream which could be recycled to the syngas generation feed, plus a fuel gas containing the bulk of the $N_2+A$ inert. This would result in reduced capital cost for the syngas production unit and reduced consumption of natural gas and oxygen feed to the syngas production unit. The thermal efficiency of conversion of feedstock to synthesis gas would be higher compared to burning the purge gas stream 121 directly.

Figure 2:
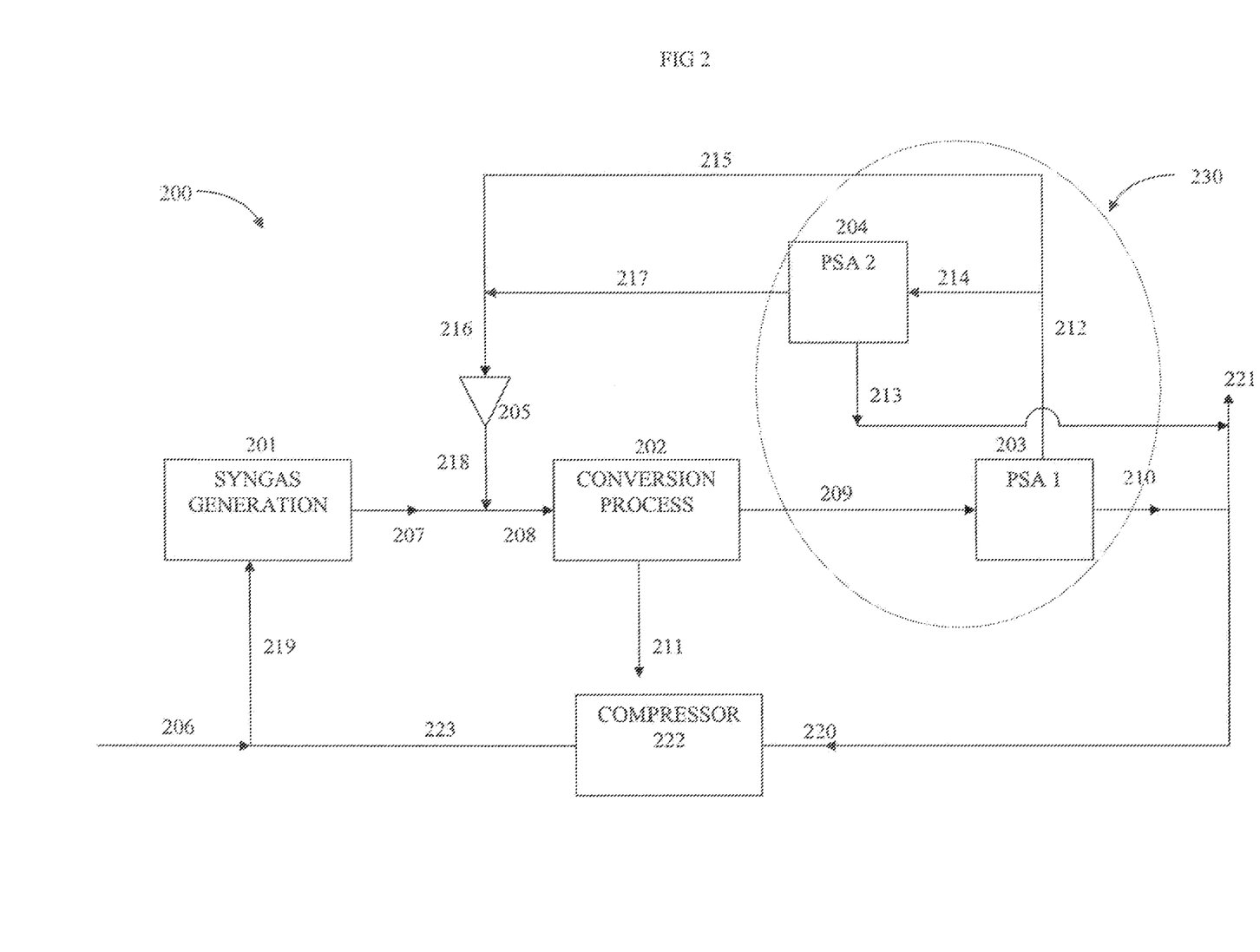
FIG. 2 illustrates an example of a synthesis gas conversion process with a pressure swing adsorption system.

FIG. 2 illustrates an example processing system 200 that includes an example absorber system 230 to provide a recycle in the processing system. A feedstock 206 comprising a hydrocarbon plus any combination of steam and oxygen together with a recycle stream 225 containing at least $CH_4$ are combined as stream 219 which is processed in a synthesis gas generation plant 201 to produce a stream 207 containing $H_2$ and CO synthesis gas together with $CH_4$, $CO_2$ and optionally $N_2+Ar$ inerts and saturated with water vapour. Optionally the plant 201 can include a step for the removal of the bulk of the $CO_2$ from the synthesis gas product stream 207. The stream 218 containing $H_2$, CO with a tolerable (e.g., a minimum amount allowed for production of system products with desired properties, such as concentration or composition) total concentration of inert components $CO_2$, $CH_4$ and $N_2+Ar$ inerts joins stream 207. The combined stream 208 enters a catalytic syngas conversion process 202 which produces a separated product stream 211 and a stream 209 of unconverted $H_2+CO$ with $CO_2$, $CH_4$, inert $N_2+Ar$, traces of product, and possible small quantities of bi-products. The stream 209 enters a first pressure swing adsorption gas separation system 203 (PSA1), where it is separated into two fractions. The first 210 includes a majority of the $CH_4$ together with any higher molecular weight hydrocarbons or by-products of the catalytic conversion process, and also a majority of the $CO_2$. There will also be some $H_2$, CO and $N_2+Ar$ inerts present. At least part of the stream 210 can be re-circulated to the syngas generation process 201 as stream 220, and a portion may be used as at least part of a fuel gas stream 221 to inhibit the buildup of $N_2+Ar$ in the system. Stream 220 is compressed in compressor 222 to the pressure of the feed to the synthesis gas generation unit 201 and delivered as stream 223. The first stream 210 is the low pressure product consisting of adsorbed species from PSA 1 which have been desorbed in the regeneration part of the PSA 1 operating cycle. The second stream 212 from PSA1 consists of the high pressure unadsorbed components from the feed stream 209, such as $H_2$, CO, $N_2+Ar$, together with a small quantity of $CH_4$ and $CO_2$. One feature of PSA1 is that the unit is designed to separate, but not completely separate, $CH_4$ from the feed gas stream. The amount of separation of methane from the feed gas stream may be selected to be sufficient to inhibit a significant concentration or concentration greater than a specified amount (e.g., an amount to significantly interfere with the process) of methane in the closed loop syngas conversion process. In one implementation, 80% to 98% of the methane may be separated. In another implementation, 85% to 95% of the methane may be separated. This may allow $CO_2$ to be separated with an efficiency of 95% to 99% of the $CO_2$ in stream 209. The PSA is designed and the operating cycle set up to obtain a maximum recovery of $H_2$ and CO syngas in stream 212 and a minimum recovery of H2+CO in stream 210 consistent with the separation of the amount of adsorbed components in stream 210 required for recycle of streams to the syn-gas generation and conversion units to maintain an acceptable level of inert components in the system. The majority of the $N_2+Ar$ inert gas will leave with stream 212.

The gas stream 212 may now be processed to recover a significant proportion in the range of approximately 25% to 60% of $N_2+Ar$ inert gas which is present in the original feed stream 207 from the syngas generation step 201. This is accomplished by dividing stream 212 into two streams. The first stream 215 bypasses the second adsorber, PSA2, which is unit 204. The second stream 214 enters PSA2, unit 204, where it is separated into a low pressure stream 213 that includes the adsorbed components nitrogen, argon, together with some $H_2$ and CO and a higher pressure stream 217, which contains the majority of the $H_2$, some $N_2+A$ and optionally some CO. The concentration of $N_2+Ar$ in the feed gas stream 214 can be allowed to build up to as high as approximately 25% to 30%, and may be in the range 10% to 20%. The amount of $N_2+Ar$ removed from the stream 214 may be in the range 50% to 90% such as in the range of approximately 70% to 85%. This performance specification may be sufficient to allow tolerable levels of $CH_4$, $N_2+Ar$ and $CO_2$ inert gas streams to exist in the syngas conversion loop, while recovering and re-circulating unconverted synthesis gas to the conversion process 202 which may otherwise be vented with the purge gas to be used as part of the fuel gas stream.

In some implementations, the syngas feed 207 has 3% of ($CH_4+N_2+Ar$). The feed 208 to the product conversion step has a concentration of 10% ($CH_4+N_2+Ar$). For this case, the syngas present in the purge gas flow to fuel is to be minimized or otherwise reduced. The design of PSA1 may be based on 90% of the $CH_4$ together with 10% of the ($H_2+CO+N_2+Ar$) present in stream 109 being present in the low pressure waste gas stream 210, while 10% of the $CH_4$ and 90% of the ($H_2+$ $CO+N_2+Ar$) may be retained in the pressurized product flow 212. PSA 2 may be designed to separate $H_2$ at approximately 90% to 95% purity containing 5% to 10% $N_2+Ar$. Since the ($N_2+Ar$) concentration is enriched by PSA1 in the pressurized product stream 212, it is natural to specify PSA2 to eliminate or otherwise reduce a significant fraction of $N_2+Ar$. In operation, PSA2 may separate most of the CO present in stream 214 into the low pressure stream 210, so the flow 214 is specified to be (e.g., be minimized) such that the overall mass balance gives a total $H_2+CO$ loss in the fuel gas stream 221, which is made up of the whole of stream 213 and part of stream 210, of less than 2% of the $H_2+CO$ in the feed stream 207. Note that the composition of the fuel gas stream 210, which is rich in $CH_4$, is such that at least part of stream 210 can be used as feed to the syngas generation system 201, stream 220, as long as there is sufficient flow in stream 221 to inhibit excessive buildup of $N_2+Ar$ in the system.

Although a specific syngas stream is described above, various feeds may be provided to the adsorber systems. The composition of the syngas may vary based on the properties (e.g., composition, concentrations, etc.) of natural gas feed stream and optionally oxygen provided to a syngas generation system. For example, the amount of methane in a stream may vary with the properties of the feed gas provided to a syngas generation system. The amount of $N_2+A$ may vary according to the purity of oxygen used in the synthesis generation unit 201. In addition, feeds other than natural gas may be used to produce syngas and/or feeds other than syngas may be provided to the adsorber system.

The adsorber system 230 includes pressure swing adsorption systems. PSA1 and PSA2 both include a multiple vessel unit with each vessel identical and set up with a piping manifold and switching valve system so that each of the vessels can pass through a series of process steps as follows (based on PSA1):

STEP 1—The feed gas 209 at a typical pressure of 20 bar to 95 bar enters the base of the vertical vessel and passes upwards leaving at the top. The adsorbent removes most of the $CH_4$ and $CO_2$ and water vapor and higher hydrocarbons and by-product minor components. The $H_2+CO$ together with most of the $N_2+A$ and a minor part of the $CH_4$ and $CO_2$ leaves the top of the vessel.

STEP 2—Optionally, the top of the vessel is connected with the top of a partially pressurized vessel and the pressure is equalized in the two vessels.

STEP 3—The top of the vessel is connected to the top of a vessel which is depressurized and purged, and the pressure in the two vessels is equalized.

STEP 4—The vessel is depressurized by opening an outlet connection from the base of the vessel to the low pressure header 210 which may be at a pressure of approximately 1.05 to 2 bars and which is connected to the fuel gas line 21 and the recycle gas line 220 feeding the recycle compressor 222.

STEP 5—The top of the vessel is connected to the product outlet header 212 and a controlled flow of product gas is reduced in pressure and flows counter currently through the bed and discharges from the base of the vessel to the fuel gas header 210. This low pressure flow with low partial pressure of $CH_4$ and $CO_2$ causes desorption of these components plus the water vapour and other hydrocarbons and minor by-products from the solid adsorbents in the vessel.

STEPS 6 and 7—The bed is progressively pressurized by connecting the top of the vessel to the top of a vessel coming off-line in one or, optionally, two or more stages as described in Steps 2 and 3, using gas from a bed or beds which are being taken off-line for regeneration at low pressure.

STEP 8—The top to the vessel is connected to the product outlet header 212 to pressurize the vessel completely.

STEP 9—The bottom of the vessel is connected to the feed gas header 209, and the vessel is put on line.

The sequence may be repeated. In some implementations, the cycle may be designed with a total cycle time for each step of, for example, five to fifteen minutes. The cycle times for each step may be fixed to allow four to 12 beds typically to be switched in an interlocking sequence familiar to those skilled in this technology.

Although the above is described in terms of a sequence and nine steps, various implementations may include more or less steps. For example, various steps may be combined, deleted, or added. In addition, the sequence of the steps may be altered. For example, the process may include a vacuum purge step (e.g., a vacuum blower may be used to desorb carbon dioxide) and/or a co-current rinse step.

In some implementations, adsorption material for the adsorbers may be selected based on the desired characteristics of the end product stream (e.g., recycle to the process). For example, alumina or silica gel may adsorb water and $CO_2$; activated carbon may adsorb $CO_2$, $CH_4$, low molecular weight hydrocarbons, and organic components; molecular sieves such as 3A, 4A, 5A, 13X may adsorb $N_2$, CO, and Ar.

In some implementations, adsorbers may include the adsorption material in a layered configuration in the bed. The configuration of the adsorption material may be selected to suit the duty or process specified. The duty required for the PSA1 may include a layer of alumina for adsorption of water and some $CO_2$, followed by a layer of carbon for the bulk of the $CH_4$ and some of the $CO_2$. One feature of a PSA includes the selective removal of the majority of the $CH_4$ and $CO_2$ with maximum flow of $H_2$ and CO to the product main 212.

In some implementations, PSA2 may be designed as a multi-vessel system with each identical vessel having a layered bed of different adsorbants set up to process a portion of the dry exit gas 214 from PSA1 to remove the majority of the nitrogen and as much of the Argon as possible with the minimum quantity of co-adsorbed CO. In some implementations, the system loss of the CO in the PSA feed stream 214 due to unavoidable co-adsorption with $N_2$ may not be a problem because the system may still only suffer less than 2% $H_2+CO$ loss in feed stream 207 to the fuel gas stream 221. $H_2$ losses from PSA2 in stream 213 may be approximately 5% to 10% of the $H_2$ in the feed stream 214.

The steps of operation of PSA2 may be similar to PSA1. The waste gas header from PSA2, line 213, is connected to the common fuel gas header and vented as part of stream 221 optionally with part of stream 210. Pressure fluctuations and discontinuities in the product and waste gas flows may be compensated by the use of gas volumes or surge tanks arranged in the waste and outlet headers using standard criteria known in the industry.

In a syngas conversion process system, fresh synthesis gas feed (e.g., stream 207) contains $N_2+Ar$ from the natural gas feed and from the oxygen feed to the synthesis gas generation unit 201 for use in a partial oxidation (PDX) reactor, or an autothermal reformer. The inerts are separated as stream 213 which is the PSA 2 total waste stream together with part of the PSA1 waste stream 210 giving stream 221. In some implementations, the total inert (e.g., $N_2+Ar$) concentration in the stream 212, must not be higher than 15%. This restriction may control the flow 214 of feed to the PSA2.

Although a specific syngas stream is described above, various feeds may be provided to the systems. The composition of the syngas may vary based on the properties (e.g., composition, concentrations, etc.) of natural gas feed stream provided to a syngas generation system. For example, the amount of methane in a stream may vary with the properties of the feed gas provided to a syngas generation system. In addition, feeds other than natural gas may be used to produce syngas and/or feeds other than syngas may also be provided to the system.

Figure 3:
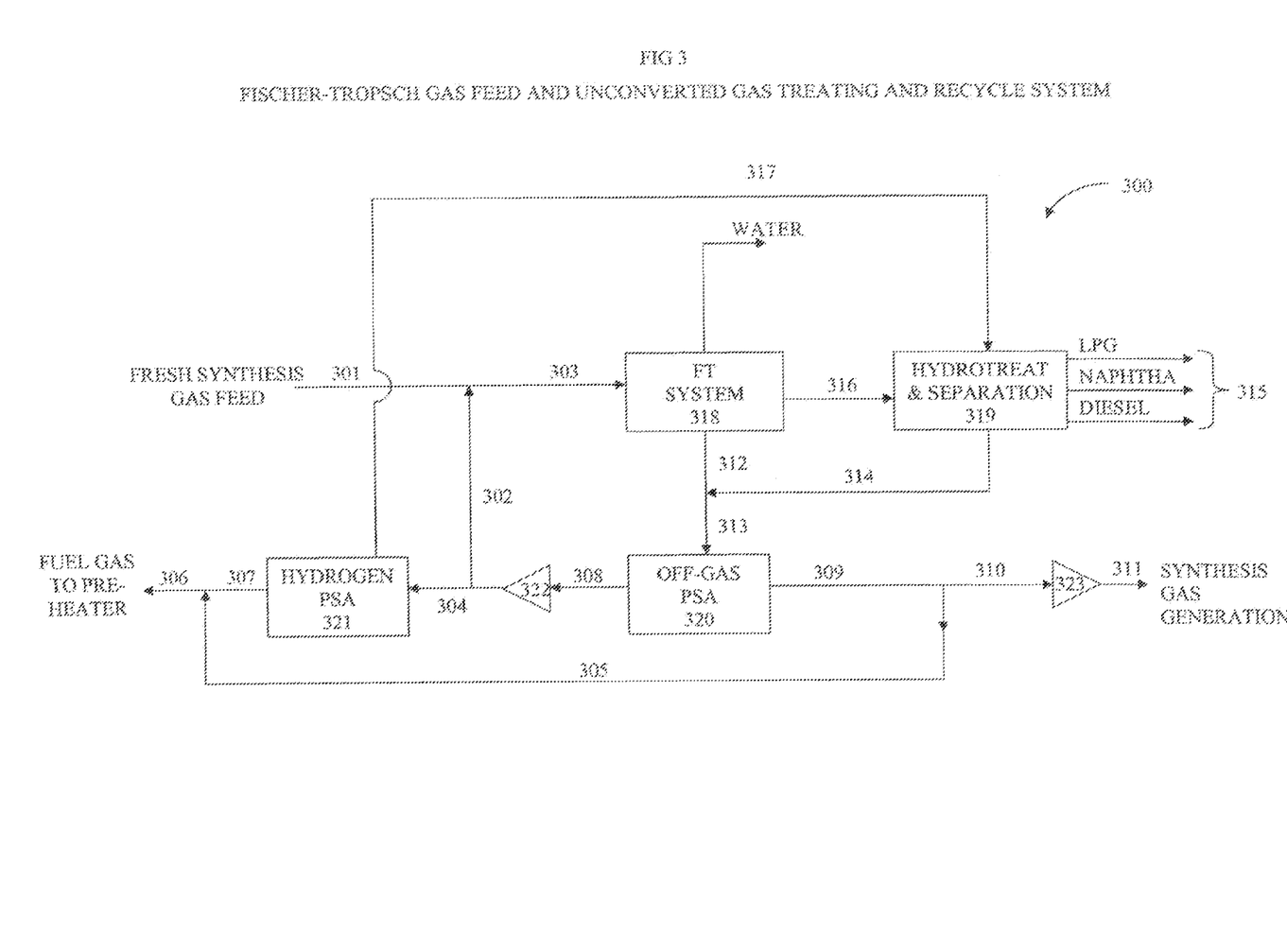
FIG. 3 illustrates an example of a Fischer-Tropsch processing system with a recycle processed by a pressure swing adsorption system.

Tables 2a-b include heat and mass values for an example of the system 300 illustrated in FIG. 3 based on the production of hydrocarbon liquids from $H_2$ and CO synthesis gas using the Fischer Tropsch process (e.g., 25,000 barrels per day basis). The oxygen and fresh natural gas feed to the syngas generation section of the plant contains a total of 102 kg mols/hr of $N_2$+A. Some of the separated $CH_4$ and $CO_2$ rich waste gas is compressed and recycled to the syngas generation section. This gas stream also contains some $N_2$+Ar. Consequently, the feed stream 301 contains 142.1 kg mols/hr of $N_2$+Ar, while the stream 310 vented to the fuel gas main contains 102 kg mols/hr $N_2$+Ar.

TABLE 2a

| Component | Stream | | | | | |
|---|---|---|---|---|---|---|
| | 301 | 302 | 303 | 304 | 305 | 310 |
| CO | 9521.6 | 828.3 | 10349.9 | 94.9 | 52.7 | 147.1 |
| $H_2$ | 18919.4 | 2024.6 | 20944.0 | 232.1 | 127.5 | 173.9 |
| $CO_2$ | 1345.7 | 25.1 | 1370.8 | 2.8 | 694.2 | 697.0 |
| $CH_4$ | 753.4 | 88.2 | 841.6 | 10.1 | 450.1 | 460.2 |
| $N_2$ + Ar | 142.1 | 659.5 | 801.6 | 75.5 | 41.6 | 102.0 |
| Total kgmol/hr | 30682.2 | 3625.7 | 34307.9 | 415.4 | 1366.1 | 1580.2 |
| Temp (° C.) | 30 | 30 | 30 | 30 | 30 | 30 |
| Pressure (bar) | 33 | 33 | 33 | 37 | 1.3 | 1.3 |

TABLE 2b

| Component | Stream | | | | | |
|---|---|---|---|---|---|---|
| | 307 | 308 | 309 | 311 | 313 | 317 |
| CO | 94.9 | 923.2 | 102.6 | 49.9 | 1025.8 | 0 |
| $H_2$ | 46.4 | 2256.7 | 250.8 | 123.3 | 2507.5 | 185.7 |
| $CO_2$ | 2.8 | 27.9 | 1364.9 | 670.7 | 1392.8 | 0 |
| $CH_4$ | 10.1 | 98.3 | 885.0 | 434.9 | 983.3 | 0 |
| $N_2$ + Ar | 60.4 | 735.0 | 81.7 | 40.1 | 816.7 | 15.1 |
| Total kgmol/hr | 214.6 | 4041.1 | 2685.0 | 1318.9 | 6726.1 | 200.8 |
| Temp (° C.) | 30 | 30 | 30 | 30 | 30 | 30 |
| Pressure (bar) | 1.3 | 27 | 1.3 | 37 | 27 | 37 |

In some implementations, a process such as the FT process may be used with a recycle provided by an adsorber system, as illustrated in FIG. 3. The FT process may have a two- or three-stage reactor system 318 operating at typically 30 bar pressure 200° C. to 220° C., in which an approximately 2:1 ratio $H_2$ to CO synthesis gas feed is converted into a range of waxy hydrocarbons predominantly having high molecular weights using a catalyst which does not promote the carbon monoxide shift reaction. These hydrocarbons are hydro-cracked and separated from unconverted synthesis gas and methane plus $C_2$-$C_4$ hydrocarbons to produce a synthetic crude oil with a suitable composition for separation into refined hydrocarbon products such as diesel and naphtha and jet fuel.

The process economics of the overall system can be significantly improved by processing the unconverted final gas mixture with one or more of the following features:

Separate a specified amount (e.g., a majority) of the $H_2$+CO synthesis gas from the hydrocarbons and the carbon dioxide and N2+A and recycle the synthesis gas to the FT feed gas stream after compression to the FT system feed gas pressure.

Separate a substantially pure hydrogen stream which is required for wax hydrogenation and cracking to produce the diesel and naphtha fractions.

Take the remaining gas which contains predominantly carbon dioxide and low molecular weight hydrocarbons and N2+Ar, and use it partly as a portion of the feed gas for the syngas generation unit and partly as a fuel gas stream for use in the synthesis gas generation section of the plant.

Ensure that the design of the separation and recycle system does not lead to an excessive build-up of inert components $N_2$, Ar and $CO_2$.

As illustrated in FIG. 3, fresh synthesis gas feed 301 from the synthesis gas generation Section at 33 bar is mixed with a recycle stream 302 giving the feed stream 303 to the FT conversion section of the plant 318. The crude waxy hydrocarbon product stream 316 is hydro-cracked, and separated in plant 319 to produce hydrocarbon fractions 315, made up of diesel, naphtha and LPG. The total off-gas stream which is saturated with water vapour and may contain 5% to 10% unconverted synthesis gas, together with methane, carbon dioxide, low molecular weight hydrocarbons, by-product traces and inert nitrogen plus argon, stream 312, and unconverted hydrogen from the hydro-cracker stream 314, are fed, stream 313, to a pressure swing adsorption (PSA1) gas separation unit 320. Here, a majority of the carbon dioxide and $CH_4$ plus all the water vapour any additional hydrocarbons and by-product traces, together with minor quantities of the $H_2$+CO syngas and $N_2$+A inert gas, may be separated by adsorption as stream 309 at about 1.3 bar pressure. The bulk of the synthesis gas H2+CO fraction together with most of the inert N2+A and a minor part of the CH4 and CO2 passes through the PSA 1, 320 at 27 bar, stream 308. The synthesis gas fraction is compressed in 322 to 37 bar and divided into two streams. The largest fraction 302 is recycled back into the feed stream 303 to the FT system 318. The smaller fraction 304 is the feed to a PSA2 unit 321 which separates a substantially pure hydrogen stream 317 used for hydro-cracking of FT waxy hydrocarbon product streams in unit 319. The waste gas 307 from the PSA2, together with part of the waste gas from PSA1, stream 305, are mixed producing stream 306 which is used as fuel gas in the burners, which are part of the process heater used for heating feed gases to the synthesis generation section. The remaining waste gas from the off-gas PSA1, stream 310 is compressed in 23 to 37 bar, stream 311, and mixed with the feed gas stream in the syngas generation unit.

The PSA Units may have the following characteristics based on the composition of stream 313

| FT Off-gas PSA 1 320 Product gas | Operating pressure 27 bar 90% of $H_2$ + CO 90% of $N_2$ + A 10% of $CH_4$ <1% of $C_2$ and higher hydrocarbons <1% of CO2 |
|---|---|

-continued

| Waste gas | remaining components |
| --- | --- |
| $H_2$ PSA | Operating pressure 37 bar |
| | 80% $H_2$ recovery |
| | 92.5% $H_2$ purity (mol %) |

Since the fresh synthesis gas feed, stream 301 contains $N_2$+A from the natural gas feed and from the oxygen feed to the syngas generation system, a place in the system where these inerts can escape is in the fuel gas burned in the syngas generation system which originates as streams 307, which is the $H_2$ PSA total waste stream together with stream 305, which is part of the off-gas PSA waste stream. In some implementations, the total inert $N_2$+Ar concentration in the FT syngas product stream 308 from the PSA 1 320, may not exceed 15%. This restriction may, in practice, control the flow 304 of feed to the $H_2$ PSA and the amount of excess hydrogen 314 from the hydro treater.

Figure 4:
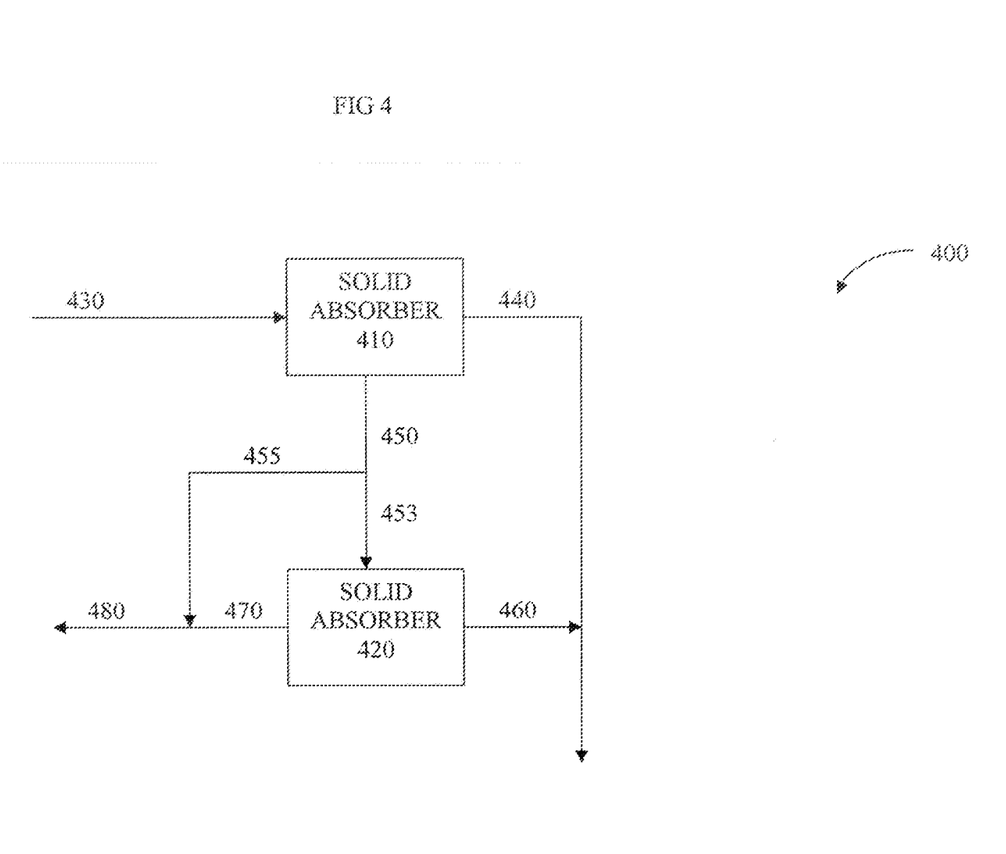
FIG. 4 illustrates an example adsorber system.

FIG. 4 illustrates an example adsorber system 400 that includes two adsorption systems 410, 420. A feed stream 430 to a first adsorption system 410 may be a product stream from another process. For example, a product stream from a Fischer-Tropsch process may be provided to the adsorption system 400. The feed stream 430 may include a plurality of components, such as hydrocarbons including methane, hydrogen, carbon monoxide, carbon dioxide, inert gases such as Argon, etc. For example, a feed stream may include syngas (e.g., carbon monoxide and hydrogen), methane and/or other hydrocarbons, carbon dioxide, and/or inerts including nitrogen and argon.

The first solid adsorption system 410 may include a material configured to adsorb a first component. For example, the adsorption system 410 may include materials such as alumina, silica gel, activated carbon, and/or various molecular sieves (e.g., 3A, 4A, 5A, 13X). The adsorption system 410 may remove a portion of the first component from the feed stream. For example, if the adsorption system 410 includes alumina and activated carbon, a portion of the water, carbon dioxide, and methane in the feed stream 430 may be adsorbed by the solid adsorber 410. The materials included in the adsorption system 410 may be selected based on the desired composition of the streams exiting the adsorber. For example, if removal of a majority of the methane in the stream is desired, an adsorption material selective to the adsorption of methane may be used in the adsorption system.

A stream 450 exiting the first adsorption system 410 may include unadsorbed compounds. The stream 450 may include a plurality of components. Since the first adsorption system 410 may not adsorb all of selected compound(s), even when the system includes an adsorption material selective to the selected compound(s), stream 450 may include at least a portion of the selected compound(s) present in the feed stream 430. A part 453 of stream 450 may be further processed by the second adsorption system 420 and/or a part 455 of the stream 450 may bypass the second adsorption system. A stream 440 including desorbed materials may also exit the adsorption system 410.

The second adsorption system 420 may adsorb one or more compounds from the part 453 of stream 450. The compounds adsorbed by the second adsorption system may be different from the compounds adsorbed by the first adsorption system to produce a stream with specified characteristics (e.g., composition, concentrations, impurities, etc.). For example, the second adsorption system 420 may adsorb inerts, such as Argon and nitrogen, and allow hydrogen and carbon monoxide to pass through the adsorption system. This may allow a stream of, for example, syngas to be recycled to another process. The product stream 470 from the second adsorption system that includes the compounds not adsorbed by the second adsorption system may be combined with the bypass stream 455 to produce stream 480.

Stream 480 may have specified characteristics, such as composition, levels of impurities, levels of inerts, pressure, etc. Stream 480 may be used as a recycle stream for another process, such as a syngas conversion process.

A stream 460 including desorbed components from the second adsorption system 420 may exit the second system. The streams 440, 460 including desorbed compounds from the first 410 and second 420 adsorption systems may be mixed and/or used as fuel gas. Since the first 410 and second 420 adsorption systems are designed to inhibit production of pure or approximately pure streams, the streams 440, 460 may include the same type of compounds present in the product streams (e.g., streams with compounds not adsorbed by the adsorber). Use of the streams 440, 460 may inhibit build-up of inerts in the system used to produce the feed gas stream 430 and/or the system to which the streams 480, 460 and 440 are separately or in various combinations recycled.

In some implementations, the first adsorber may operate at from approximately 20-40 bars, or at approximately 27 bars. Stream 450 or the product stream from the first adsorber 410 may include 90% of $H_2$+CO from the feed stream 430, 90% of $N_2$+Ar from the feed stream 430, 10% of $CH_4$ from the feed stream 430, and <1% of $C_2$ and higher hydrocarbons and $CO_2$ from the feed stream 430. Stream 440 that includes the desorbed compounds from the first adsorption system may include the remaining components of the feed stream 430.

The second adsorption system may operate at a pressure of from approximately 20-40 bars, or approximately 27 bars. The product stream from the second adsorption system 420 may include 80% of the hydrogen from the feed stream 453 and may have a composition of approximately 95% to 98 mol % hydrogen.

A number of implementations of the invention have been described. Nevertheless, it will be understood that various modifications may be made without departing from the spirit and scope of the invention.

For example, a process for the separation of a gas mixture 130 produced as a product stream from a process system converting feed-stocks into products may include of two multiple bed pressure swing adsorption units. A feed stream 130 consisting of a mixture of gaseous components may be passed into a first PSA 1 unit 110 that separates the gas mixture into one fraction 140 which is composed predominantly of adsorbed components which are produced at a reduced pressure and a second fraction 150 which is composed of a gas mixture of predominantly un-adsorbed components which are produced at a pressure close to and below the feed gas pressure to the first PSA 1. At least a portion of the predominantly un-adsorbed gas mixture 153 may be passed from the first PSA 1 through a second PSA 2 unit 120 that separates the gas mixture into one fraction 160 which is composed predominantly of adsorbed components which are produced at a reduced pressure and a second fraction 170 which is composed of a gas mixture of predominantly un-adsorbed components which are produced at a pressure close to and below the feed gas pressure to the second PSA 2. At least a portion 155 of the predominantly un-adsorbed gas mixture from the first PSA 1 may bypass around the second PSA 2 and mix this stream with at least a portion of the predominantly un-adsorbed gas mixture from the second PSA 2 to form a stream of predominantly un-adsorbed gas mixture 180 produced by the two PSA units. The predominantly un-adsorbed total gas mixture 180 may be recycled to the upstream processing system. The predominantly adsorbed gas mixture 140 from the first PSA 1 unit 110 may be recycled to the upstream processing system. The predominantly adsorbed gas mixture 160 from the second PSA 2 unit 120 may be recycled to the upstream processing system.

The two PSA units may be characterised by the presence in the predominantly un-adsorbed gas mixture 150 from the first PSA 1 of a significant fraction of the components adsorbed by the first PSA 1 unit and optionally by the presence in the predominantly un-adsorbed gas mixture 170 from the second PSA of a significant fraction of the components adsorbed by the second PSA.

In some implementations, some implementations may include one or more of the following: pre-dominantly adsorbed gas mixture from PSA 2 and optionally part of the adsorbed gas mixture from PSA 1 may be used as fuel gas streams which provide heat on combustion by indirect heat transfer to allow inert components from the production process to be vented to the atmosphere in the combustion gases; separated quantities of components present in the predominantly adsorbed gas mixtures produced from PSA1 and PSA2 are such that the build-up of inert components in the production process caused by the recycle of streams from PSA 1 and PSA 2 may be kept a maximum limit imposed by the requirements of the production process; the production process may be a Fischer-Tropsch synthesis of liquid hydrocarbons with a hydro-treating and product separation system; the feed stream 209 to PSA 1 may be the gaseous product stream from the Fischer Tropsch process comprising hydrogen, carbon monoxide, methane, carbon dioxide, water vapour, nitrogen, argon, higher hydrocarbons and traces of oxygenates; predominantly un-adsorbed gas stream 12 from PSA 1 contains from 80% to 95% of the hydrogen, carbon monoxide, nitrogen and argon and from 5% to 15% of the methane and from 0.1% to 3% of the carbon dioxide, higher hydrocarbons and oxygenates present in the feed gas stream 9 to PSA 1; predominantly un-adsorbed gas stream 12 from PSA 1 may be divided into 2 streams with one stream 215 bypasses the PSA 2 while the second stream 214 becomes the feed to PSA 2 and the flow distribution between the two streams 214 and 215 may be such that the separation of nitrogen and argon together in the predominantly adsorbed gas steam 213 is in the range 50% to 90% and preferably in the range 55% to 80% of the quantity of nitrogen and argon together present in the total fresh hydrocarbon and oxygen feed streams to the synthesis gas generation system 1; predominantly adsorbed gas stream 213 from PSA 2 and at least a portion of the predominantly adsorbed gas stream 210 from PSA 1 may be mixed to form a fuel gas stream 21 having a total nitrogen plus argon content equal to the quantity of nitrogen plus argon present in the total fresh hydrocarbon and oxygen feed streams to the synthesis gas generation system; the fuel gas stream 221 may be not mixed with any feed stream to the synthesis gas generation system 1 or the Fischer Tropsch conversion process 2; and/or the fuel gas stream is combusted in air or oxygen to provide heat for the synthesis gas generation system 1 and the combustion products may not mixed with any feed stream to the synthesis gas generation system 1 or to the Fischer Tropsch conversion process 2.

The invention claimed is:

1. A method for processing a feed stream from a synthesis gas production process, comprising:
    separating in a first Pressure Swing Absorption (PSA) system a feed stream into a first fraction including substantially adsorbed components and a second fraction including substantially un-absorbed components, the first fraction including a majority of $CH_4$ and $CO_2$ from the feed stream, the second fraction including a majority of $H_2$ and CO from the feed stream;
    passing a first portion of the second fraction to a second PSA system;
    separating in the second PSA system the first portion of the second fraction into a third fraction including substantially adsorbed components and a fourth fraction including substantially un-absorbed components, the fourth fraction a majority of the $H_2$ in the first portion; and
    passing at least one of a second portion of the second fraction or the fourth fraction to form a stream recycled to a synthesis-gas conversion process including a majority of the $H_2$ and CO from the unconverted gas stream.

2. The method of claim 1, further comprising combusting at least a portion of the first fraction and the third fraction to generate heat by indirect heat transfer and venting inert and combustion components from the feed stream to a surrounding atmosphere.

3. The method of claim 1, wherein a feed stream to the synthesis-gas conversion process substantially maintains a concentration of inert components at or below a specified limit.

4. The method of claim 1, wherein a total inert concentration in a feed stream to the synthesis-gas conversion process is in the range 5 mol % to 25 mol %.

5. The method of claims 1, wherein a concentration of $CH_4$ in the second fraction is substantially maintained between a molar concentration 2% and 15%.

6. The method of claims 1, wherein at least 80% of the CO in the feed stream is contained in the second fraction.

7. The method of claims 1, wherein at least 80% of the combined $N_2$+A in the feed stream is contained in the second fraction.

8. The method of claims 1, wherein at least 80% of the $H_2$ in the feed stream is contained in the second fraction.

9. The method of claim 1, wherein the synthesis-gas conversion process uses a Fischer-Tropsch synthesis of liquid hydrocarbons with a hydro-treating and product separation system.

10. The method of claims 1, wherein at least portion of the forth fraction is used as a feed stream to the synthesis-gas conversion process.

11. The method of claims 1, wherein the synthesis-gas conversion process uses a methanol production process.

12. The method of claim 1, the feed gas comprising unconverted gas stream from a Fischer-Tropsch process.

13. The method of claim 1, wherein the third fraction includes 50% to 90% of the $N_2$+A from the feed stream.

14. The method of claim 1, further comprising combusting the first fraction and the third fraction to produce heat for a synthesis gas generation system independent of combining combustion products with feed streams to the synthesis-gas generation process or the synthesis-gas conversion process.

15. The method of claim 1, further comprising an upstream system that combusts at least a portion of the first fraction and the third fraction to generate heat by indirect heat transfer and venting inert and combustion components from the feed stream to a surrounding atmosphere.

16. The method of claims 1, wherein at least 80% of the CO in the feed stream is contained in the second fraction.

17. The method of claims 1, wherein at least 80% of the combined $N_2$+A in the feed stream is contained in the second fraction.

18. The method of claims 1, wherein at least 80% of the $H_2$ in the feed stream is contained in the second fraction.

19. The method of claim 1, wherein the third fraction includes 50% to 90% of the $N_2+A$ from the feed stream.

20. A system for processing hydro-carbons, comprising:
a first Pressure Swing Absorption (PSA) system that separates a feed stream into a first fraction including substantially adsorbed components and a second fraction including substantially un-absorbed components, the first fraction including a majority of $CH_4$ and $CO_2$ from the feed stream, the second fraction including a majority of $H_2$ and CO from the feed stream;
a second PSA system that receives a first portion of the second fraction and separates the first portion of the second fraction into a third fraction including substantially adsorbed components and a fourth fraction including substantially un-absorbed components, the fourth fraction a majority of the $H_2$ in the first portion; and
a conversion process system receives syngas and at least one of a second portion of the second fraction or the fourth fraction to form a stream recycled to a synthesis-gas conversion process including a majority of the $H_2$ and CO from the unconverted gas stream.

* * * * *